Oct. 30, 1923. 1,472,761
B. W. KING
SCALE
Filed May 14, 1920 5 Sheets-Sheet 2

Inventor
Bert W. King
By Stuart C. Barnes
Attorney

Oct. 30, 1923.
B. W. KING
SCALE
Filed May 14, 1920 5 Sheets-Sheet 3
1,472,761
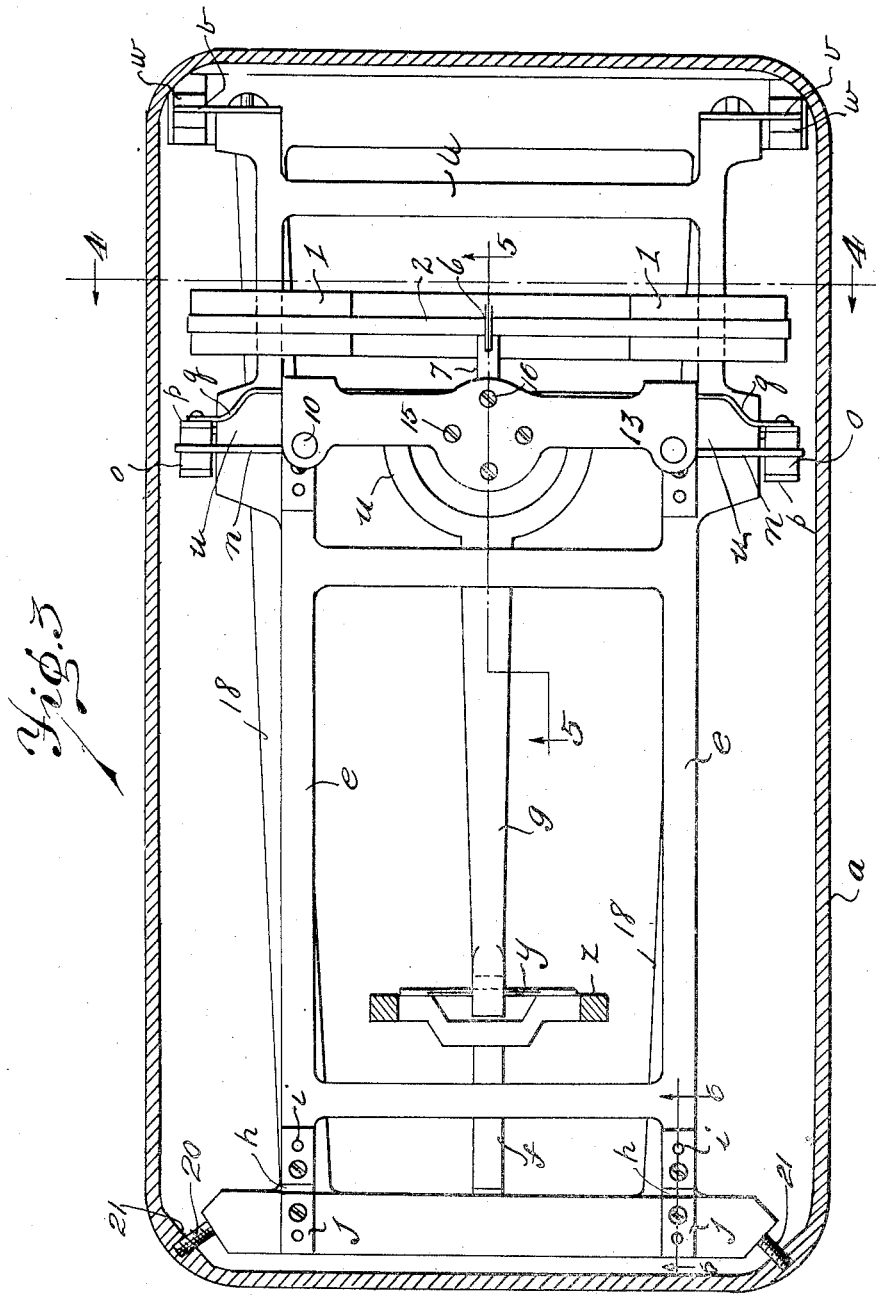

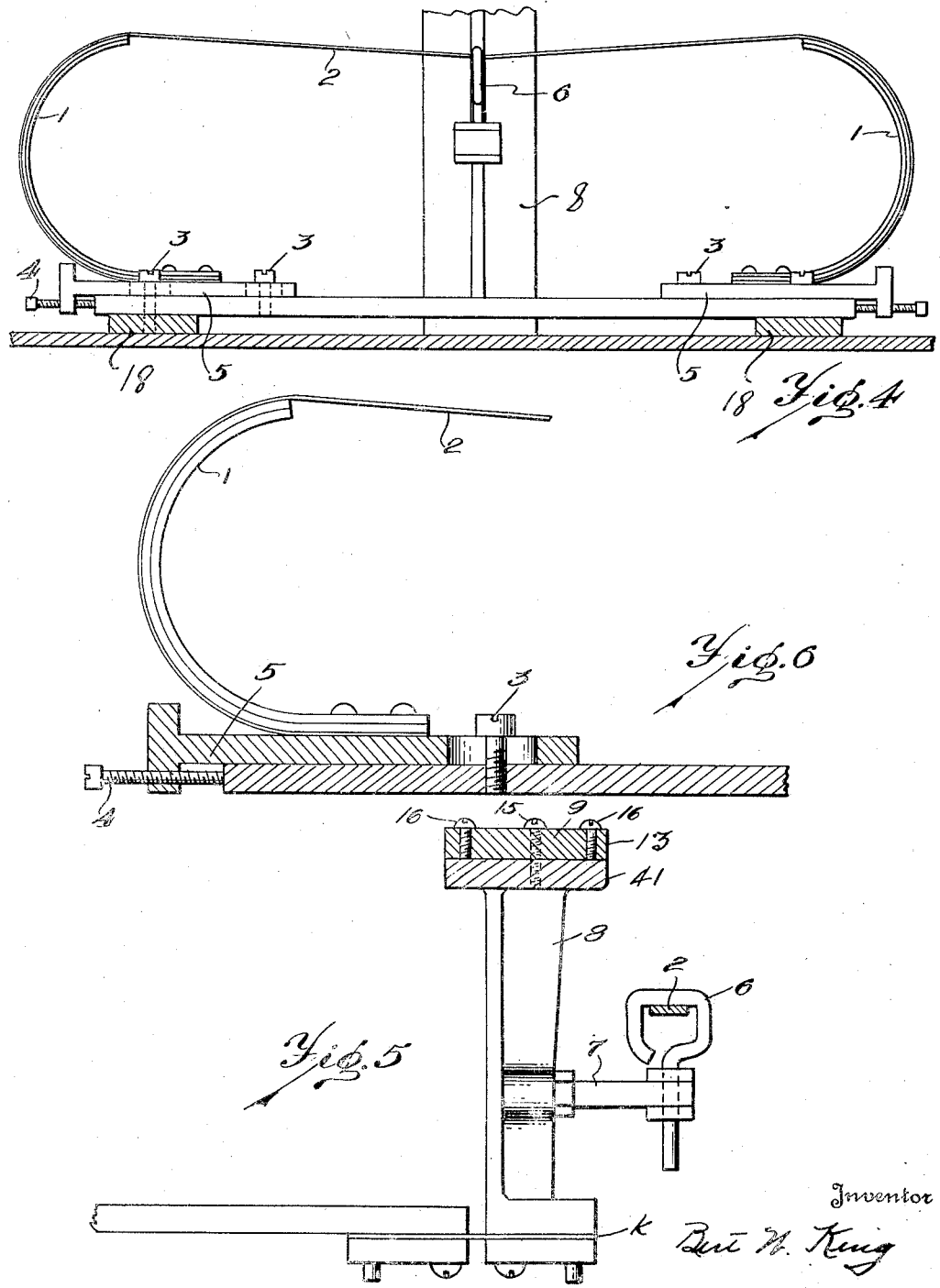

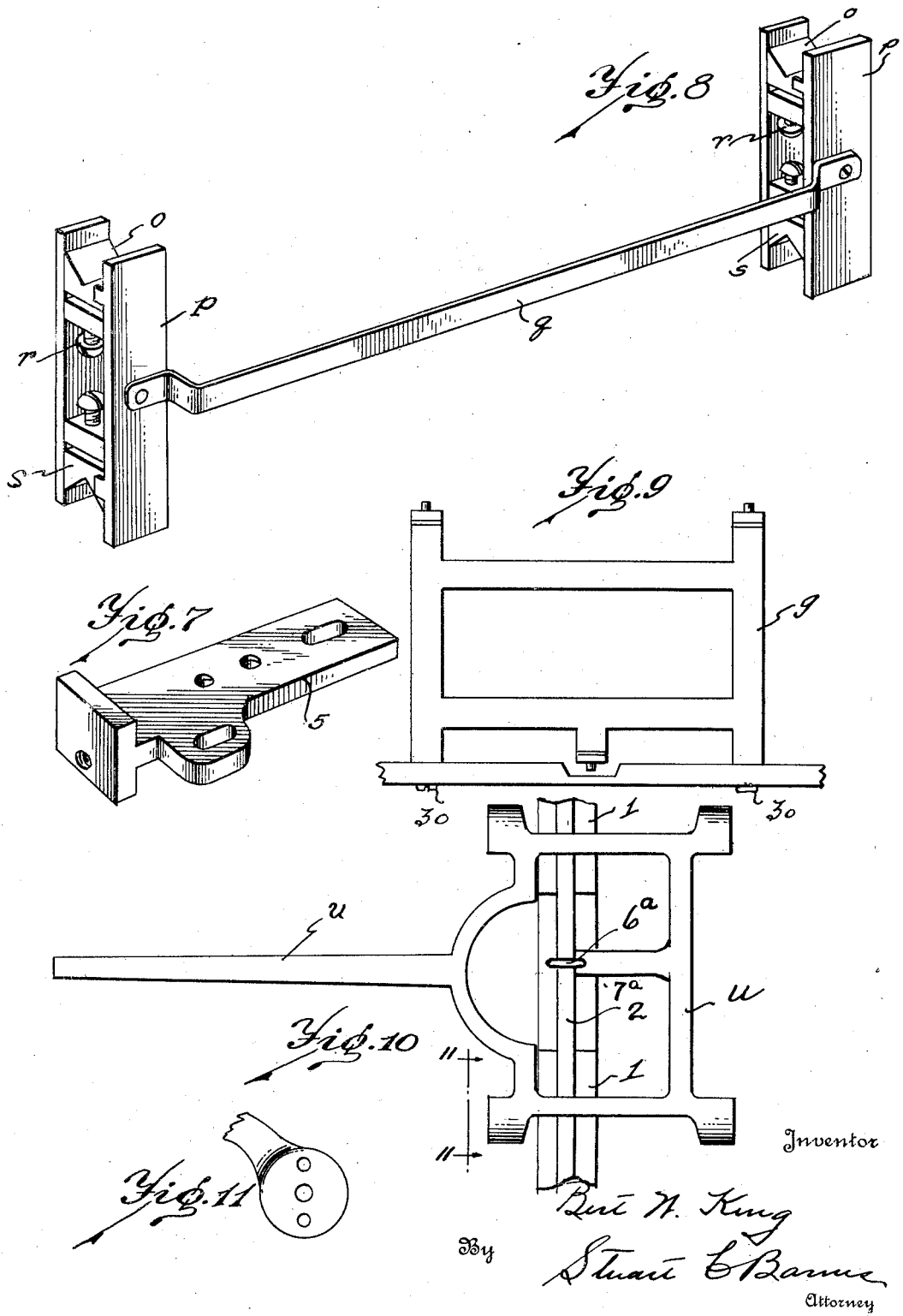

Patented Oct. 30, 1923.

1,472,761

UNITED STATES PATENT OFFICE.

BERT W. KING, OF DETROIT, MICHIGAN.

SCALE.

Application filed May 14, 1920. Serial No. 381,246.

*To all whom it may concern:*

Be it known that I, BERT W. KING, a citizen of the United States, residing at Detroit, in the county of Wayne and State of Michigan, have invented certain new and useful Improvements in Scales, of which the following is a specification.

This invention relates to weighing scales and has for its object a scale provided with a novel form of thermostat, a novel lever arrangement, a novel attachment of the platform to the platform support, a novel connection between the draft rod and the dash pot, and a novel form of knife edge. These features will more fully appear in the description following.

In the drawings,—

Fig. 3 is a horizontal section through the base showing the operating parts largely in plan view.

Fig. 4 is a vertical cross section through the base showing in detail the thermostat, and taken on the line 4—4 of Fig. 3.

Fig. 5 is a fragmentary vertical longitudinal section showing the attachment of the platform stem to the thermostat, and also to the platform support.

Fig. 6 is an enlarged detail of one of the ends of the thermostat.

Fig. 7 is a perspective of the slide that supports the thermostat end.

Fig. 8 is a perspective of the push link between the platform lever and the indicating lever.

Fig. 9 is an elevation of the posts that fulcrum the platform lever and the check link.

Fig. 10 is a plan view of the indicating lever with a modified form of thermostat.

Fig. 11 is a view taken on the line 11—11 of Fig. 10.

Fig. 12 is a section on the line 12—12 of Fig. 2.

Fig. 13 is a sectional detail of one of the plate fulcrums.

Fig. 14 is a small plan view showing the attachment between the draft rod and the dash pot.

Fig. 15 is a section on the line 15—15 of Fig. 14.

Fig. 16 is a vertical section through the platform.

$a$ designates the base; $b$ the pedestal, both of which are castings and secured together by screws passing through the abutting lugs $c$. $d$ designates the usual drum housing. The usual counterbalancing springs are confined within the drum housing and need not be here shown as they are no part of the present invention.

The lever arrangement comprises a platform-supporting link $e$ which comprises two parallel arms connected with suitable cross bars, as is shown in Fig. 3. A single check link $f$ is in parallel relation with the platform levers. These two levers are fulcrumed on the posts $g$ at the front of the machine and which are held to the stand 18 by the screws 30. These posts can be set any desired distance ahead of the pedestal so as to employ levers of any desired length without increasing the distance between the rear of the pedestal and the rear of the base. This is advantageous as a good many of the counters in butcher shops and groceries are now provided with a sort of glass housing which limits the distance the pedestal can be shoved forward on the counter. The two platform lever arms and the single check lever are fulcrumed to the post $g$ by means of the plate fulcrums $h$ detailed in Fig. 13. A single pin $i$ on each of the fulcrum members serves to prevent the plate fulcrum from swinging, while screws and clamping blocks $j$ serve to clamp the ends of the plates to the fulcrum member. Similarly the other end of the check link $f$ is pivotally attached to the platform stem by the plate fulcrums $k$, while the rear ends of the platform lever arms are pivotally secured to the platform stem top 41 by means of the plate fulcrums $m$. These plate fulcrums are not only cheaper than agate bearings but they are very effective in this connection in case a load is placed upon the edges of the platform, which would ordinarily tend to cause the parallelogram of levers to tilt, the knife edges climbing in the V groove. With the plate fulcrums no tendency of this kind occurs and consequently no error is introduced in the indications by reason of an eccentric load.

Figure 1:
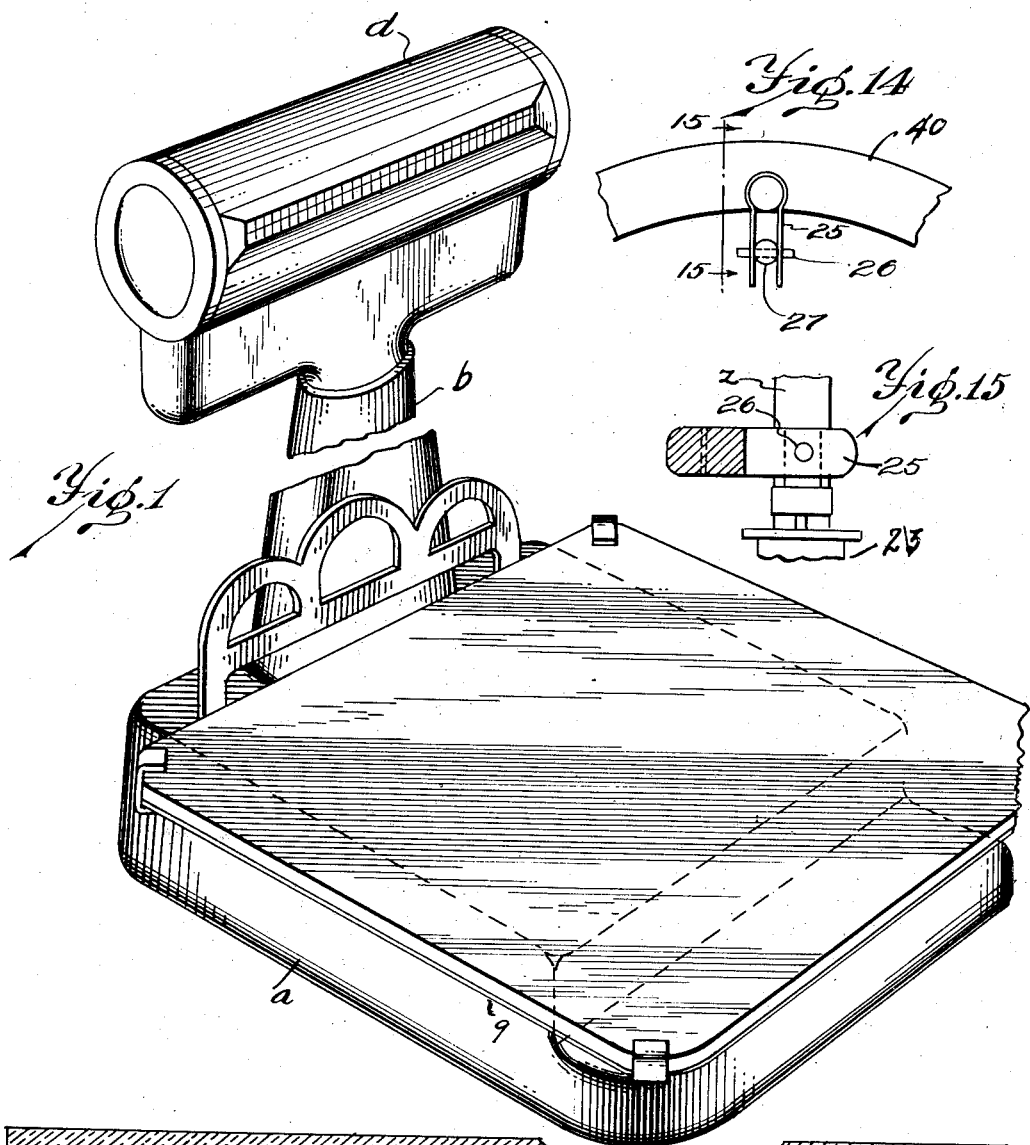
Fig. 1 is a perspective of the scale.
Figure 2:
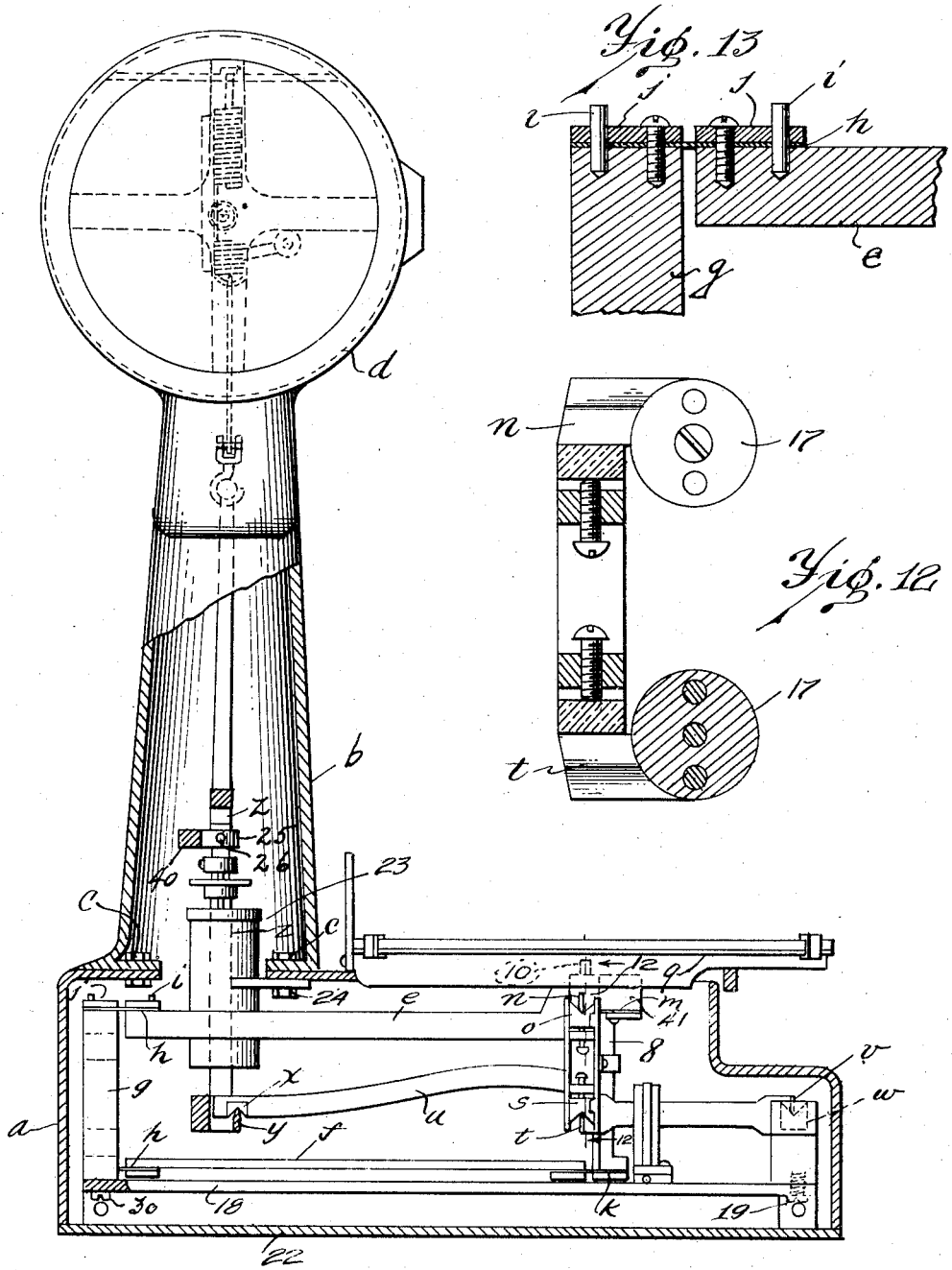
Fig. 2 is a side elevation partly in vertical section.

Now turning to Fig. 2, it will be seen that the platform lever or link $e$ is provided with laterally-projecting knife edges $n$ (see also Fig. 3). These are adapted to engage in the agate bearings $o$ of the push link detailed in Fig. 8. The push link comprises a pair of agate bearing chairs $p$ connected by the strap $q$. The agate bearings may be adjusted upon the knife edges in the chairs by the screws $r$. Similarly at the lower ends of the chairs agate bearings $s$ can be adjusted and engaged with the laterally-projecting knife edges $t$ on the indicating lever $u$. It will be noticed by referring to Fig. 2 that the line of these two pivots runs through the points where, at half capacity of the scale, the plate fulcrums $k$ and $m$ break from the straight plane in bending. Consequently the thrust of the load against the indicating lever is substantially directly under the center of the platform. Hence also the so-called platform lever $e$ is more in the nature of a link as practically no alteration of the leverage of the load transmitted through it occurs.

The indicating lever $u$ is provided with knife edges $v$ which rest in the agate bearings $w$ at the rear of the machine. The front of this lever is provided with a V block $x$ which engages the knife edge $y$ on the draft rod $z$. This makes the lever a lever of the third order and a movement-multiplying lever.

As is well known, counterbalancing springs of a spring scale vary in accordance with the temperature and some compensation has to be provided for this to secure an accurate scale at all temperatures. I have provided a special thermostat arrangement for this which is both effective and simple. This thermostat is removably screwed to the stand 18. It secures a zero balance no matter what the temperature and also increases the resistance directly as the temperature so as to compensate for the weakening of the springs as the temperature increases. This thermostatic arrangement comprises a pair of C springs 1—1 made of metals of different co-efficients of expansion so that as the temperature rises the C springs open out, tightening the metal ribbon 2 that reaches from end to end of the springs. This tightening of the ribbon is so calculated that it will return the indicator to zero. At the same time the springs 1—1 in opening out increase their resistance and the resistance of the ribbon to the load and consequently make up for the weakening of the counterbalancing springs in the drum housing: For instance, in a 30 lb. capacity scale, the main counterbalancing springs may be "sealed" to offer a resistance of from 29# 8 oz. to 29# within a temperature variation of 100 degrees and the thermostat springs C may be made to offer a resistance of 8 oz. to 16 oz. within the 100 degree variation, hence adding an ounce of resistance for each ounce of resistance lost in the main counterbalancing springs and thereby giving a perfect load balance by dividing the load resistance between two members that are calculated one to add an equal amount of resistance as the other loses a unit amount of resistance.

Adjustment of these thermostatic springs and ribbon can be had by loosening the clamping screws 3 and operating the adjusting screws 4 to re-locate the slides 5 that bear the lower ends of the thermostatic C springs. The hook 6 is attached to the arm 7 of the platform stem 8 and engages over the ribbon 2 so as to distribute some of the load to the thermostatic C springs 1.

The platform 31 is attached to the platform support 13 in a simple but effective way. At the ends of the platform support are posts 10 (Figs. 3 and 16) over which fit the downwardly-projecting hollow bosses 11. Set screws 12 are adapted to fasten the platform 9 to the platform support 13 by being threaded through the bosses and jamming against the post 10. The screwdriver holes 33 are located in the platform apron 14 so that these screws may be readily reached from the front of the machine and the platform removed very easily at any time desired. The spacing of the platform support 13 from the top 41 of the platform stem 8 may be accomplished by the screws shown in Fig. 5. The screws 15 can be used to draw the platform support and the stem together while the screws 16 can be used to space them.

The knife blades such as $n$ and $t$ shown in Fig. 12 are made as stampings. The knife edges on the same may be machined by mounting the same upon a revolving head so that a great number of them may be machined at the same time, resulting in a very much cheaper construction. The body of the knife edge is in the form of a circular head 17 which may be secured to the boss-like ends of the levers by screws.

The operating parts of the machine are removably mounted on a base 18 provided with legs 19 adapted to receive screws 20 (Fig. 3) which removably secure the frame in the threaded openings 21 at the corners of the housing base. The frame, together with the parts mounted upon it, may be slipped into the housing base from the bottom, the plate 22 being removed.

The dash pot 23 (Fig. 2) is secured to the lugs $c$ at one side of the pedestal by means of the arm 24. The draft yoke $z$ has a cross bar 40 provided with a U-like spring 25 (Figs. 14 and 15) whose legs can be spread and snapped over the pin 26 engaging through the dash pot plunger stem 27. Hence the draft rod may be very easily and quickly coupled up with the dash pot plunger.

It will be noticed that the platform and platform slab extend very materially over the sides of the base. This is advantageous as it removes under obstruction that might interfere with commodities that often hang down, such as the head of a chicken and similar articles that tend to hang over the sides of a scale.

In Fig. 10 I have shown the thermostat attached by the hook 6ª to an arm 7ª secured to the indicating lever. For some reasons I prefer this construction to the connection of the thermostat to the platform stem.

What I claim is:

1. In a scale, the combination of a platform, levers for supporting the same, and a thermostat comprising a ribbon arranged to take part of the load and a thermostatic C spring secured to the end of the ribbon for the purpose of moving the ribbon and varying the resistance to the load as the temperature varies.

2. In a scale, the combination of a platform, levers for supporting the platform, and a thermostatic spring arrangement connected to one of the operating members under the platform to take part of the load on the platform independently of the main counterbalancing springs.

3. In a scale, the combination of a platform, a platform stem, levers for supporting the same, and a thermostat in the form of a spring variable with thermal changes and connected to one of the operating members under the platform to take part of the load and increase the resistance directly as the temperature increases.

4. In a scale, the combination of a platform, levers for supporting the same, a thermostat operating under the platform and wholly independent of the counterbalancing springs and comprising a spring arrangement arranged to take part of the load on the platform and adapted to increase its resistance directly as the temperature increases.

5. In a scale, the combination of a platform, levers for supporting the same, and a thermostat comprising a spring arrangement in the form of a pair of adjustably locatable blocks bearing thermostatic C springs connected by a ribbon arranged to take part of the load of the platform and arranged to increase its resistance directly as the temperature increases.

6. In a scale, the combination of a platform, an operating member thereunder, an arm projecting from the operating member, a ribbon engaged by the arm, and spring means connected with the ribbon adapted to increase the resistance to the load at this point directly as the temperature increases.

7. In a scale, the combination of a platform, an operating member thereunder, an arm connected to the said operating member, a ribbon adapted to be engaged by the arm, and a thermostatic C spring engaging the end of the ribbon adapted to increase the resistance to the load directly as the temperature increases.

8. In a scale, the combination of a platform, a stem, a platform-supporting lever and check link supported in parallel relation and connected pivotally with the stem, an indicating lever and a push link connection between the platform lever and the indicating lever operating in substantially the plane of pivotal connection between the platform-supporting lever and the check link with the platform stem.

9. In a scale, the combination of a platform, a platform stem, a platform-supporting lever and check link pivotally supported and pivotally connected with the said stem and in parallel relation with each other, an indicating lever directed in the opposite direction to that of the platform-supporting lever, and a link connection between the said indicating lever and the platform-supporting lever located substantially in the plane of the pivotal connection between the platform-supporting lever and the check link with the said stem.

10. In a scale, a knife edge in the form of a stamping provided with a knife portion and a head portion in a single plane and struck out of a flat piece, the head portion being removably securable to the end of one of the operating members.

11. In a scale, a knife edge bearing in the form of a stamping from a flat piece of stock provided with a knife portion and a head portion, the latter of which can be removably secured to one of the operating members.

12. In a scale, a plate fulcrum comprising a flexible plate, a clamping block, both of which are provided with a pair of perforations, an anchoring member and a screw for passing through one of the perforations of block and plate into the anchoring member, and a pin for passing through the other set of perforations in the block and plate into the anchoring member.

13. In a scale, the combination of a housing base, a stand provided with depending legs having openings therethrough for screws, screws passing through said openings into the housing base and removably securing the stand to the housing base, and operating parts for the scale supported upon said stand.

14. In a scale, the combination of a platform support provided with a pair of upstanding posts, a platform provided with a pair of hollow depending bosses adapted to fit over the post and each provided with a set screw opening, and a depending apron for said bosses provided with screw-driver apertures therethrough and said screws passing through the openings in the posts to removably secure the bosses to the upstanding post, the said apertures through the apron being in line with the said set screws.

15. In a scale, the combination of a dash pot suitably supported, a draft rod and a U spring secured to the draft rod and removably securable to the dash pot plunger.

16. In a scale, the combination of a dash pot provided with a plunger having a transverse pin therethrough, a movable member adjacent said dash pot and provided with a U spring having perforations through the legs thereof, the said legs being spreadable to engage over the pin of the dash pot plunger to form a removable connection therewith.

17. In a weighing scale, the combination of a draft member, a dash pot provided with a plunger having a pin therethrough, and a U spring secured to the draft member and having perforated legs which may be temporarily separated to engage the pin of the dash pot plunger rod to form a detachable connection.

18. In a weighing scale, the combination of a housing, a stand, front and rear post constructions removably securable to the stand, pivoted operating parts supported on said front and rear post constructions, and means for removable securing the stand in the housing.

19. In a weighing scale, the combination of a housing, a stand provided with depending legs having openings therethrough, screws for removably securing the legs in the housing, and posts and scale operating parts secured upon the stand.

20. In a weighing scale, the combination of a housing, a stand provided with depending legs having openings therethrough, screws for removably securing the legs to the housing, posts removably secured to the stand, and operating parts of the scale pivotally supported by the posts.

21. In a scale, the combination of a platform, levers for supporting the same, and counterbalancing means including springs that weaken with an increase in temperature and a thermostatic spring element that interposes added spring resistance equal to the loss of resistance in the first-mentioned springs.

22. In a scale, the combination of a platform, levers for supporting the same, and counterbalancing spring means divided into an element that decreases its resistance as the temperature increases, and a thermostatic element that as the temperature rises increases spring resistance an amount equal to the loss of resistance in the first element.

23. In a scale, the combination of a platform, levers for supporting the same, and counterbalancing spring means including a spring that loses resistance as the temperature rises and a flat spring that increases its spring resistance an equal amount when the temperature rises to compensate for the change.

24. In a scale, the combination of a platform, levers for supporting the same and two separate counterbalancing spring sets, one calculated to lose resistance as the temperature increases and the other calculated to increase its resistance as the temperature increases, and the two coordinated so that what one loses in units of resistance the other makes up in units of resistance.

In testimony whereof I affix my signature.

BERT W. KING.